US007656112B2

(12) United States Patent
Hayashi et al.

(10) Patent No.: US 7,656,112 B2
(45) Date of Patent: Feb. 2, 2010

(54) CONTROLLER FOR DRIVING MOTOR, DRIVING DEVICE FOR DRIVEN MEMBER, INK-JET PRINTER, AND METHOD OF DRIVING DRIVEN MEMBER

(75) Inventors: Toru Hayashi, Suwa (JP); Kenji Hatada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 235 days.

(21) Appl. No.: 11/732,456

(22) Filed: Apr. 3, 2007

(65) Prior Publication Data

US 2007/0229013 A1 Oct. 4, 2007

(30) Foreign Application Priority Data

Apr. 3, 2006 (JP) ............................ 2006-101681

(51) Int. Cl.
*G05B 5/00* (2006.01)

(52) U.S. Cl. ........................ 318/466; 318/468; 318/476

(58) Field of Classification Search ................ 318/466, 318/468, 476, 443, 445; 358/1.12
See application file for complete search history.

(56) References Cited

U.S. PATENT DOCUMENTS 6,390,698 B1 5/2002 Yoshida et al.
6,967,729 B1 * 11/2005 Iwamura .................... 358/1.12
2006/0062620 A1 * 3/2006 Tanjo et al. ................. 399/401

FOREIGN PATENT DOCUMENTS

JP 2001-158143 6/2001
JP 2005-271456 10/2005

* cited by examiner

*Primary Examiner*—Karen Masih
(74) *Attorney, Agent, or Firm*—Nutter McClennen & Fish LLP; John J. Penny, Jr.

(57) ABSTRACT

A driving device for a driving motor includes: a driving motor, driving a driven member; a control command value generating unit, generating a control command value that becomes a larger value as a control deviation becomes larger, as a control command value to the driving motor; an abutting member on which the driven member abuts; and a stop instructing unit, completing generation of the control command value by the control command value generating unit to stop the driven member when the control command value generated by the control command value generating unit becomes more than a predetermined judgment threshold value.

5 Claims, 5 Drawing Sheets

CONTROLLER FOR DRIVING MOTOR, DRIVING DEVICE FOR DRIVEN MEMBER, INK-JET PRINTER, AND METHOD OF DRIVING DRIVEN MEMBER

BACKGROUND

1. Technical Field

The present invention relates to a controller for a driving motor, a driving device for a driven member, an ink-jet printer, and a method of driving a driven member.

2. Related Art

Patent Document 1 discloses a printer. In this printer, a carriage is reciprocated along a guide member by driving of a carriage motor. Also, in the carriage located above a cap, a nozzle orifice surface of a recording head is sealed by the cap lowered and raised by a cap elevating mechanism.

Patent Document 1: JP-A-2005-271456 (FIG. 1 and Paragraphs 0018, 0021, etc. in Section "Best Mode for Carrying Out the Invention")

As in Patent Document 1, the printer can carry out printing by moving the carriage along the guide member. Also, in various control sequences, it is necessary to position the carriage in a position above the cap in Patent Document 1, a home position, and the like, for example after scanning for printing.

However, the position and speed of the carriage generally are detected by reading a bright and dark pattern formed along the scanning direction of the carriage by an optical sensor provided in the carriage. Also, the absolute position of the carriage in the scanning direction cannot be detected only by this detection method. Also, the fact that the carriage is in a position above the cap, the home position, and the like cannot be detected by this detection method. Therefore, for example, in order to position the carriage in a position above the cap after scanning or to position the carriage in the home position, it is necessary to separately provide a sensor which detects that the carriage is, for example in those positions.

In addition, grasping the absolute positions of various driven members, such as a carriage, is required for control in other driving motors, such as a sheet transporting motor, which are used in a printer, or is also required for control in apparatuses having various driving devices, such as a scanner and an automatic paper feeder, other than the printer.

Also, it is desired to carrying out control in a driving device which uses a driving motor for driving a driven member, etc. so that the driving load of the driving motor may not become excessive.

SUMMARY

An advantage of some aspects of the invention is to provide to obtain a controller for a driving motor, a driving device for a driven member, an ink-jet printer, and a method of driving a driven member, capable of preventing the driving load of the driving motor from being excessive. Another object of the present invention is to obtain a driving device for a driven member, an ink-jet printer, and a method of driving a driven member, capable of grasping the absolute positions of various driven members, such as a carriage, without using a sensor which detects the absolute position. The advantage can be attained by at least one of the following aspects:

A first aspect of the invention provides a controller for a driving motor comprising: a control command value generating unit, generating a control command value that becomes a larger value as a control deviation becomes larger, as a control command value to the driving motor for driving a driven member; and a stop instructing unit, completing generation of the control command value by the control command value generating unit to stop driving of the driving motor when the control command value generated by the control command value generating unit becomes more than a predetermined judgment threshold value.

If this configuration is adopted, driving of the driving motor will stop when the load of the driving motor increases. Therefore, the driving load of the driving motor can be prevented from becoming excessive.

A second aspect of the invention provides a driving device for a driving motor comprising: a driving motor, driving a driven member; a control command value generating unit, generating a control command value that becomes a larger value as a control deviation becomes larger, as a control command value to the driving motor; an abutting member on which the driven member abuts; and a stop instructing unit, completing generation of the control command value by the control command value generating unit to stop the driven member when the control command value generated by the control command value generating unit becomes more than a predetermined judgment threshold value.

If this configuration is adopted, the driving load of the driving motor can be prevented from becoming excessive. Moreover, the driven member can be stopped in a state where the driven member abuts on the abutting member. Therefore, the absolute position of the driven member can be grasped without using a sensor which detects the absolute position.

The driving device for a driven member according to the second aspect, may further comprise a judgment threshold value calculation unit calculating, based on the control command value generated by the control command value generating unit, a judgment threshold value larger than the control command value while the driving motor periodically moves the driven member.

If this configuration is adopted, the judgment threshold value will be periodically updated to a value according to the driving load of the driven member every time by the judgment threshold value calculation unit. It is desirable that the judgment threshold value is set to, for example, a value having a predetermined margin with respect to an actually generated driving load of the driven member. The judgment threshold value can be set to a minimum value that makes it possible to distinguish the fact that the driven member is moving from the fact that the driven member has stopped.

On the other hand, for example, if the judgment threshold value is a fixed value, it is necessary to consider a temporal fluctuation in the driving load of the driven member, a variation in the torque characteristics of the driving motor, etc., and the judgment threshold value should be set to a larger value than a predetermined margin with respect to an actually generated driving load of the driven member by that much. Also, whenever the driven member is abutted on the abutting member by the stop instructing unit, the driving motor generates a driving torque having this excessive judgment threshold value.

As a result, the driving torque generated by the driving motor can be suppressed by adopting this configuration. It is not necessary to give high rigidity to a member to which the driving motor, the driven member, etc. are attached, unlike the case where the judgment threshold value is a fixed value. It is also not necessary to increase the strength and reliability of a driving transmission mechanism which transmits the driving force of the driving motor to the driven member, unlike the case where the judgment threshold value is a fixed value.

The driving device for a driven member according to the second aspect, may further comprise a prescribed distance driving instructing unit, causing the control command value generating unit to generate a control command value for allowing the driven member to be driven by a prescribed distance in a direction away from the abutting member after the stop instructing unit stops the driven member, in addition to each of the configurations of the invention as described above.

If this configuration is adopted, the driven member can be stopped in a position where it is driven by a prescribed distance from a position where it abuts on the abutting member.

In the driving device for a driven member according to the second aspect, in addition to each of the configurations of the invention as described above, the driven member may be a carriage having a recording head which discharges ink.

If this configuration is adopted, the carriage can be stopped in a state where it abuts on the abutting member.

In the driving device for a driven member according to the second aspect, in addition to each of the configurations of the invention as described above, the abutting member may be disposed at an end of a moving range of the carriage.

If this configuration is adopted, the carriage can be stopped at the end of the moving range.

The driving device for a driven member according to the second aspect, may further comprise a driving pulley, driven by driving power of the driving motor; a driven pulley, disposed in a position away from the driving pulley; a housing, holding the driving pulley and the driven pulley rotatably; and a driving belt which is stretched between the driving pulley and the driven pulley and to which the carriage is attached, wherein the abutting member is disposed at an end of the housing on a side of the driving pulley.

If this configuration is adopted, the driving force of the driving motor when the carriage is caused to abut on the abutting member is transmitted to the carriage via the driving pulley and the driving belt. Also, the driving torque of the driving motor in a state where the carriage has abutted on the abutting member is received by the housing. Therefore, the high driving torque of the driving motor in a state where the carriage has abutted on the abutting member is not applied to the driven pulley, etc. Thus, it is not necessary to increase the rigidity and strength of the driven pulley, a member which holds the driven pulley, and the like.

A third aspect of the invention provides an ink-jet printer comprising: a recording head for printing; a movable carriage; a driving motor, driving the carriage; a control command value generating unit, generating a control command value that becomes a larger value as a control deviation becomes larger, as a control command value to the driving motor; an abutting member on which the carriage abuts; and a stop instructing unit, completing generation of the control command value by the control command value generating unit to stop driving of the driving motor when the control command value generated by the control command value generating unit becomes more than a predetermined judgment threshold value.

If this configuration is adopted, the driving load of the driving motor can be prevented from becoming excessive. Moreover, in the ink-jet printer, the carriage can be stopped in a state where the carriage abuts on the abutting member. Therefore, in the ink-jet printer, the absolute position of the carriage can be grasped without using a sensor which detects the absolute position.

A fourth aspect of the invention provides a method of driving a driven member comprising: generating a control command value for causing a driven member to be driven by a driving motor and to move in a direction in which the driven member abuts on an abutting member; updating the control command value to become a larger value as a control deviation becomes larger; and completing generation of the control command value to stop the driven member when the updated control command value becomes more than a predetermined judgment threshold value.

If this method is adopted, the driving load of the driving motor can be prevented from becoming excessive. Moreover, the driven member can be stopped in a state where the driven member abuts on the abutting member. Therefore, the absolute position of the driven member can be grasped without using a sensor which detects the absolute position.

The present disclosure relates to the subject matter contained in Japanese patent application No. JP 2006-101681 filed on Apr. 3, 2006, which is expressly incorporated herein by reference in its entirety.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a controller for a driving motor, a drive for a driven member, an ink-jet printer, and a method of driving a driven member according to an embodiment of the present invention will be described with reference to the accompanying drawings. As for the controller for a driving motor and the driving device for a driven member, a drive for a carriage in the ink-jet printer will be described as an example. The method of driving a driven member will be described as a portion of the operation of the ink-jet printer.

Figure 1:
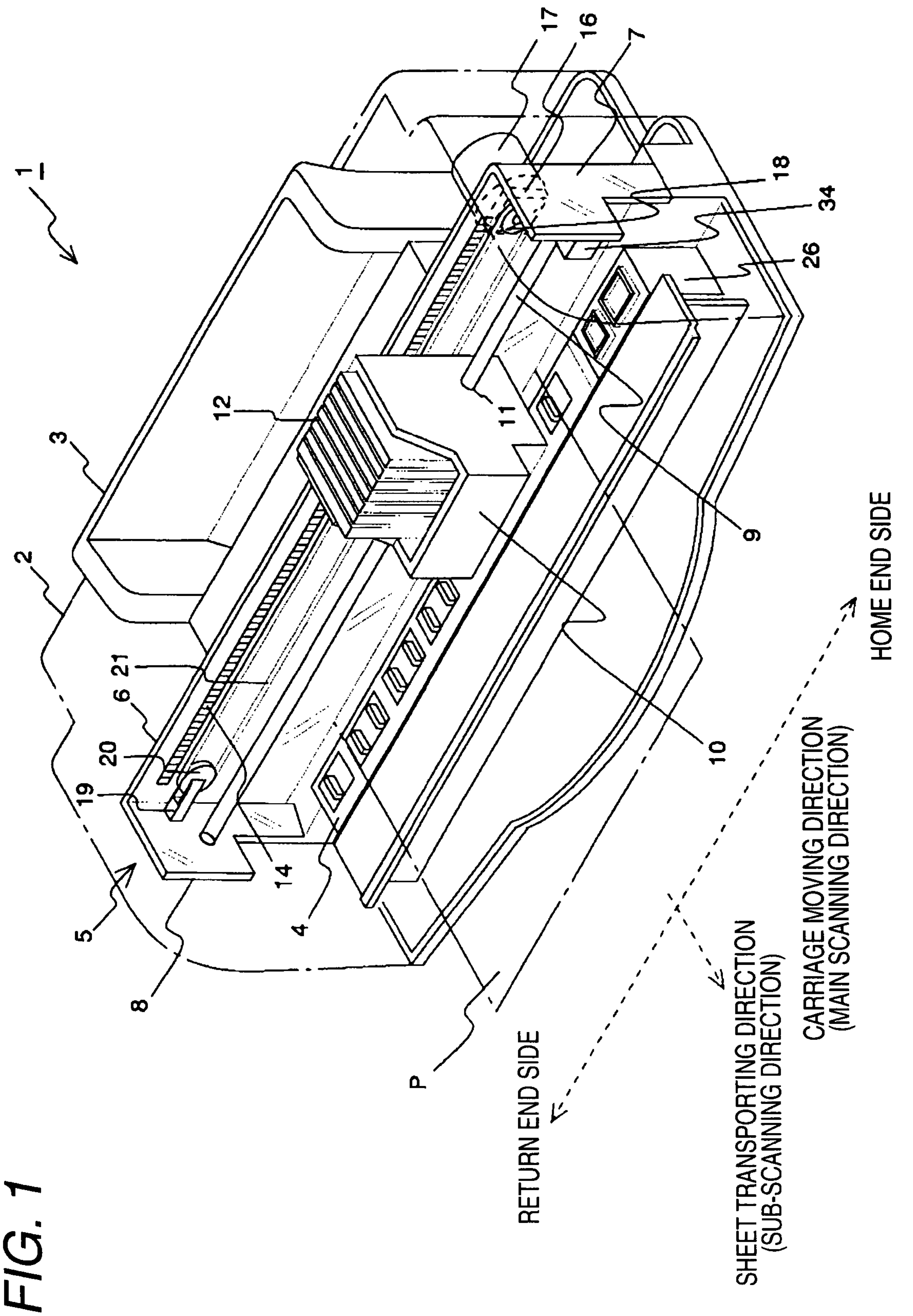
FIG. 1 is a block diagram of an ink-jet printer according to an embodiment of the present invention.

FIG. 1 is a perspective view showing the configuration of the ink-jet printer 1 according to an embodiment of the present invention. The ink-jet printer 1 has a printer housing 2 composed of a chassis and a cover and having a substantially rectangular parallelepiped shape. A paper feed tray 3 is disposed in the printer housing 2. Papers P are placed in the paper feed tray 3. The papers P placed in the paper feed tray 3 are transported from the paper feed tray 3 by a paper transporting mechanism composed of a PF (paper feed) motor, an LD (loading) roller, a PF roller, a paper discharge roller, etc., which are not shown. The papers P transported from the paper feed tray 3 move within the printer housing 2, and are discharged to the outside of the printer housing 2 from the front (lower left in FIG. 1) of the printer housing 2.

A platen 4 is disposed within the printer housing 2. The platen 4 is disposed in the width direction of papers P to be transported below a transporting path of the papers P. Also, a carriage supporting section 5 as a housing is disposed above the transporting path of papers P. The carriage supporting section 5 and the platen 4 are disposed such that they are spaced apart from each other with a gap through which a paper P can pass.

The carriage supporting section 5 has a rear part 6 having almost the same length as the platen 4, and a pair of side parts 7 and 8 which project in the same direction from both ends of the rear part 6. Hereinafter, when the pair of side parts 7 and 8 are distinguished from each other, the lower right side part in FIG. 1 is referred to as "home side part 7," and the upper left side part in FIG. 1 is referred to as "return side part 8." Also, the home side part 7 side is referred to as "home end side," and the return side part 8 side is referred to as "return end side."

The carriage supporting section 5 is formed substantially in the shape of the letter "U" in cross-section, for example, by bending both ends of a long steel plate having a thickness of 1 to 3 millimeters in the same direction. In this case, both the bent ends become the pair of side parts 7 and 8, and a long part between the ends becomes the rear part 6. By forming the carriage supporting section of a steel plate of 1 to 3 millimeters, the carriage supporting section 5 has high rigidity. Even when a CR motor 17 is driven by a duty command value that is almost the same value as a judgment threshold value as will be described below, the carriage supporting section 5 has such high rigidity that it is not bent. In addition, the peripheral edge of a steel plate as the carriage supporting section 5 may be bent further. Accordingly, the rigidity of the carriage supporting section 5 can be increased further, or the thickness of the steel plate can be made still smaller.

The carriage supporting section 5 is disposed with a posture in which the pair of side parts 7 and 8 are on the downstream side in the transporting direction of papers P from the rear part 6. In this case, the rear surface of the rear part 6 faces the paper feed tray 3.

A carriage shaft 9 is stretched between the home side part 7 and the return side part 8. The carriage shaft 9 is provided by forming metal in the shape of a cylinder. Both ends of the carriage shaft 9 are attached to the pair of side parts 7 and 8, respectively.

A carriage 10 is disposed at the carriage shaft 9 so as to be movable in the axial direction of the carriage shaft 9. The carriage 10 has a through hole 11. The carriage shaft 9 is inserted through the through hole 11. Also, the undersurface of the carriage 10 faces the platen 4.

Figure 2:
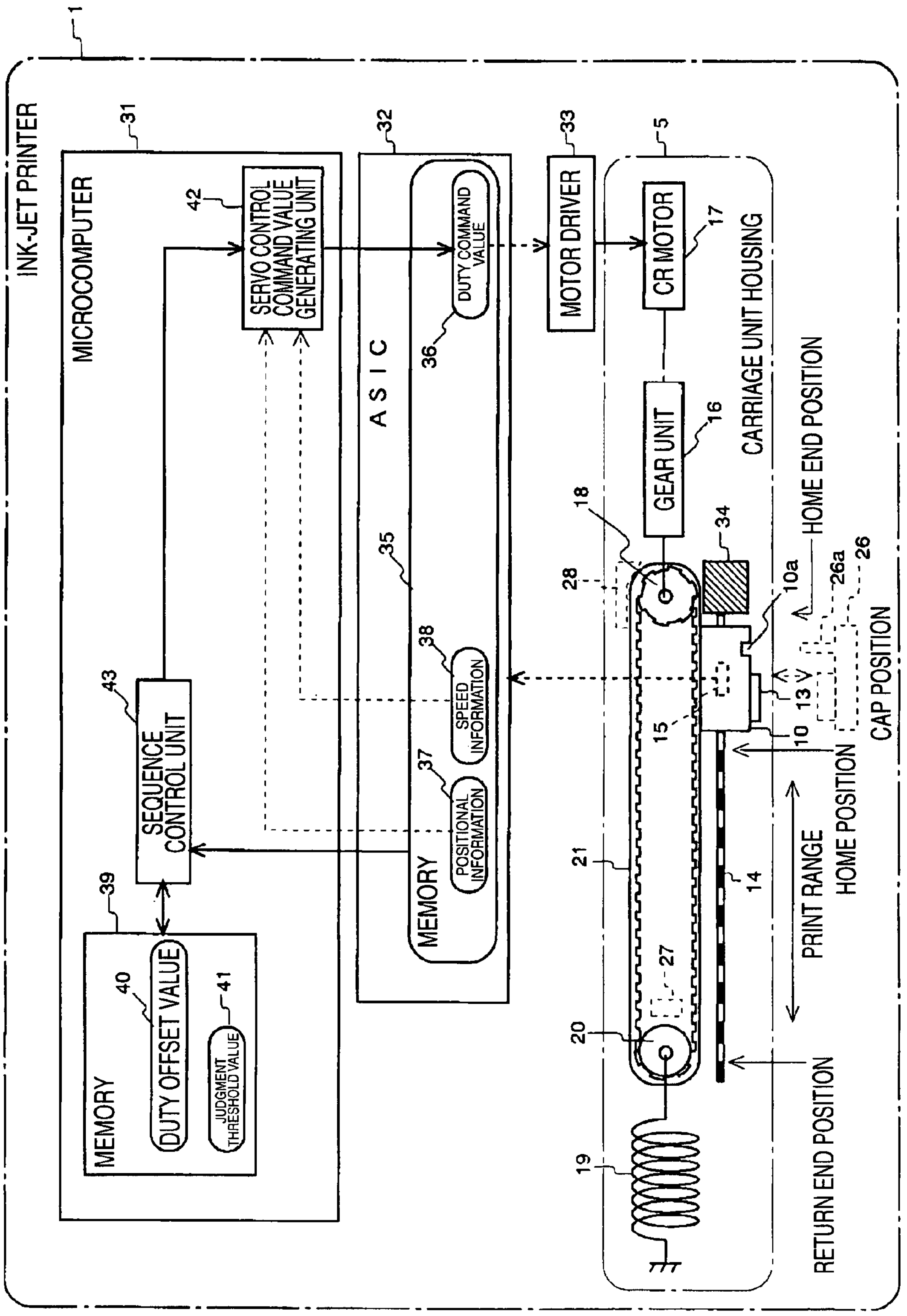
FIG. 2 is a block diagram showing a driving device for a carriage.

A plurality of ink tanks 12 and a recording head 13 are disposed in the carriage 10. The ink tanks 12 are detachably mounted to an upper portion of the carriage 1. The recording head 13 is disposed on the undersurface of the carriage 10 facing the platen 4, as shown in FIG. 2 as will be described below. The recording head 13 has a plurality of discharge nozzles (not shown). The plurality of discharge nozzles are filled with the ink to be supplied from the ink tanks 12. The plurality of discharge nozzles discharge ink towards the platen 4.

A linear pattern 14 is disposed on the surface of the rear part 6 of the carriage supporting section 5 which faces the carriage 10. The linear pattern 14 has a bright and dark pattern, for example. The bright and dark pattern is arranged from the home side part 7 of the carriage supporting section 5 to the return side part 8 thereof.

Also, as shown in FIG. 2 as will be described below, an optical sensor 15 is disposed at the carriage 10. The optical sensor 15 is disposed such that a light-emitting element and a light-receiving element (not shown) face each other with a gap therebetween. The optical sensor 15 is disposed at the carriage 10 such that the linear pattern 14 is located between the light-emitting element and the light-receiving element. The light-emitting element radiates light to the linear pattern 14. A transparent portion of the linear pattern 14 transmits light. This light enters the light-receiving element. The light-receiving element outputs a detection signal having a level according to the quantity of the received light. In addition, the waveform of the detection signal will become a pulse waveform when the light transmitted through the linear pattern 14 is received at such intervals that it is intercepted by dark portions of the linear pattern 14.

A gear unit 16 and the CR (carriage) motor 17 as a driving motor are disposed on the home end side of the rear part 6 of the carriage supporting section 5. The gear unit 16 and the CR motor 17 are disposed on the rear surface (surface on the side of the paper feed tray 3) of the rear part 6.

The CR motor 17 is a DC motor, for example. The DC motor has a stator composed of permanent magnets (not shown), and a rotor having a coil. The rotor of the DC motor will rotate when a current flows into the coil. When a current in pulses flows into the coil, the rotor rotates at a speed according to the duty ratio of the pulses. As the duty ratio of the pulses to be supplied to the coil is larger, the driving torque of the DC motor becomes larger. When the duty ratio of the pulses becomes 100%, a current will continue flowing into the DC motor, and thereby the DC motor will output a greatest driving torque.

The gear unit 16 has a plurality of gears (not shown) which mesh with each other. The gear unit 16 has, for example, an input gear and an output gear which mesh with each other. When the input gear rotates, the output gear rotates with the rotation of the input gear. The input gear is fixed to the rotor of the CR motor 17. A driving pulley 18 is fixed to the output gear.

The driving pulley 18 has a disk shape. The driving pulley 18 is rotatably disposed on the front surface (surface on the side of the carriage 10) on the home end side of the rear part 6. Also, an outer periphery of the driving pulley 18 is formed in a concavo-convex shape.

One end of a spring member 19 is fixed to the return side part 8 of the carriage supporting section 5. The end of the spring member 19 is fixed to the return side part 8 between the carriage shaft 9 and the rear part 6. A driven pulley 20 is rotatably attached to the other end of the spring member 19.

The driven pulley 20 has a disk shape. An outer periphery of the driven pulley 20 is formed into a smooth curved surface.

A driving belt 21 is stretched between the driving pulley 18 and the driven pulley 20. The driving belt 21 is stretched with a predetermined tension by the tension of the spring member 19. An inner periphery of the driving belt 21 is formed in a concavo-convex shape. Concavities and convexities of the inner periphery of the driving belt 21 mesh with concavities and convexities of the outer periphery of the driving pulley 18. Accordingly, the driving belt 21 rotates suitably following the rotation of the driving pulley 18.

The carriage 10 journalled to the carriage shaft 9 is fixed to the driving belt 21. Accordingly, when the driving belt 21 rotates, the carriage 10 will move axially along the carriage shaft 9. The carriage 10 movably journalled to the carriage shaft 9 moves in the axial direction of the carriage shaft 9 with the rotation of the driving belt 21.

FIG. 2 is a block diagram showing a driving device for the carriage 10 in the ink-jet printer 1 of FIG. 1. The driving device for the carriage 10 has a microcomputer 31, an ASIC (Application Specific Integrated Circuit) 32, a motor driver 33, and an abutting member, in addition to the carriage supporting section 5, the CR motor 17, the gear unit 16, the driving pulley 18, the driving belt 21, the driven pulley 20, the spring member 19, etc., as described above.

The abutting member 34 is disposed at the home side part 7 of the carriage supporting section 5 as shown in FIG. 1. The abutting member 34 is disposed on the surface of the home side part 7 which faces the return side part 8. The abutting member 34 projects towards the return side part 8 from the home side part 7. In addition, the abutting member 34 can be formed, for example, by bending a portion of the home side part 7 formed from a steel plate towards the return side part 8.

When the carriage 10 moves towards the home side part 7 along the carriage shaft 9, it will abut on the abutting member 34. The carriage 10 cannot be moved further from a position where it abuts on the abutting member 34. Hereinafter, the position of the carriage 10 which abuts on the abutting member 34 is referred to as "home end position."

As the position of the carriage 10, in addition to the home end position, there are, for example, a return end position nearest to the return side part 8, a print range within which the recording head 13 faces the platen 4, a cap position facing a cap member 26 (refer to FIG. 1) disposed on the home side of the platen 4, and a home position set between the cap position and the print range. The cap member 26 is movable in a vertical direction in which it is separated from and is brought close to the carriage 10, and when the cap member is controlled to its raised position, the cap member will seal the recording head 13 of the carriage 10 in the cap position. In addition, the cap position and the home position may be the same position.

The motor driver 33 generates pulses of a duty ratio specified by a duty command value, and then outputs them to the CR motor 17.

The ASIC 32 is a kind of the microcomputer 31, and has a memory 35. The memory 35 of the ASIC 32 stores various kinds of control command values and detection information. As the control command values, there is, for example, a duty command value 36 for the CR motor 17, etc. The duty command value 36 is periodically updated by an operation command value generated by a servo control command value generating unit 42 as will be described below. As the detection information, there are, for example, positional information 37 on the carriage 10, speed information 38 on the carriage 10, and the like.

The motor driver 33 and the optical sensor 15 are connected to the ASIC 32. The ASIC 32 supplies the duty command value 36 stored in the memory 35 to the motor driver 33. The ASIC 32 counts the number of pulses as a detection signal of the optical sensor 15. The ASIC 32 also periodically updates the speed information 38 on the carriage 10 stored in the memory 35 on the basis of the counted value per unit time. The ASIC 32 also periodically updates the positional information 37 on the carriage 10 stored in the memory 35 on the basis of a cumulative counted value.

The microcomputer 31 has a memory 39. The memory 39 of the microcomputer 31 stores a duty offset value 40, a judgment threshold value 41, etc.

The duty offset value 40 is a value used when the operation of the judgment threshold value 41 is carried out, and is a value equivalent to a predetermined detection margin.

The judgment threshold value 41 is a value to be compared with the duty command value 36. The judgment threshold value 41 is periodically updated by load measurement processing as will be described below.

Also, the servo control command value generating unit 42 as a control command value generating unit, and a sequence control unit 43 as a judgment threshold value operating unit, a stop instructing unit, and a prescribed distance driving instructing unit are implemented in the microcomputer 31. The servo control command value generating unit 42 and the sequence control unit 43 are implemented when a CPU (Central Processing Unit) (not shown) of the microcomputer 31 executes control programs (not shown).

In addition, it is desirable that the control programs are stored in, for example, the memory 39 of the microcomputer 31. The control programs to be stored in the memory 39 of the microcomputer 31 may be stored in the memory 39 before shipment of the ink-jet printer 1, or may be stored in the memory 39 after shipment. The control programs to be stored in the memory 39 after shipment can be provided to a user in a state where they are stored in computer-readable recording media, such as CD-ROMs, or can be provided to a user through data transmission media, such as the Internet. In addition, some of the control programs to be stored in the memory 39 may be provided to a user by computer-readable recording media or transmission media.

The sequence control unit 43 executes a predetermined printing sequence on the basis of the print data to be supplied to the ink-jet printer 1. The sequence control unit 43 also executes a predetermined initializing sequence at the time of supply of power to the ink-jet printer 1. The sequence control unit 4.3 specifies the target position, target traveling distance, target speed, etc. of the carriage 10 for the servo control command value generating unit 42, etc. during execution of these sequences.

The sequence control unit 43 also reads the positional information 37 on the carriage 10, the speed information 38 on the carriage 10, the duty command value 36, etc. from the memory 35 of the ASIC 32. The sequence control unit 43 proceeds to execution steps of a sequence or completes the sequence, on the basis of the read information.

The servo control command value generating unit 42 will generate an operation command value (control command value) for driving the CR motor 17 when the target position, target traveling distance, target speed, etc. of the carriage 10 are specified. The operation command value has information on a duty ratio of the pulses to be supplied to the CR motor 17. In addition, the operation command value may have information on the direction of rotation of the CR motor 17, etc. along with the information on a duty ratio. The servo control command value generating unit 42 updates the duty command value 36 stored in the memory 35 of the ASIC 32 by using the generated operation command value.

The servo control command value generating unit 42 also periodically reads the positional information 37 on the carriage 10, the speed information 38 on the carriage 10, etc., from the memory 35 of the ASIC 32. The servo control command value generating unit 42 calculates an operation command value on the basis of the read positional information 37 on the carriage 10, and the read speed information 38 on the carriage 10, and then periodically updates the duty command value 36.

For example, if the detection speed of the carriage 10 is slower than a specified target speed, the servo control command value generating unit 42 generates an operation command value larger than the duty command value 36 written in the memory 35 of the ASIC 32, and then updates the duty command value 36 of the memory 35 of the ASIC 32 with the operation command value. As a control deviation is larger, the servo control command value generating unit 42 generates an operation command value which increases the duty ratio, and then updates the duty command value 36 of the memory 35 of the ASIC 32.

Next, the operation of the ink-jet printer 1 according to the embodiment having the above configuration will be described. In the following description, especially, the operation of positioning the carriage 10 in the home position when power is supplied to the ink-jet printer 1 will be described.

When power is supplied to the ink-jet printer 1, the sequence control unit 43 will execute a predetermined initializing sequence.

Figure 3:
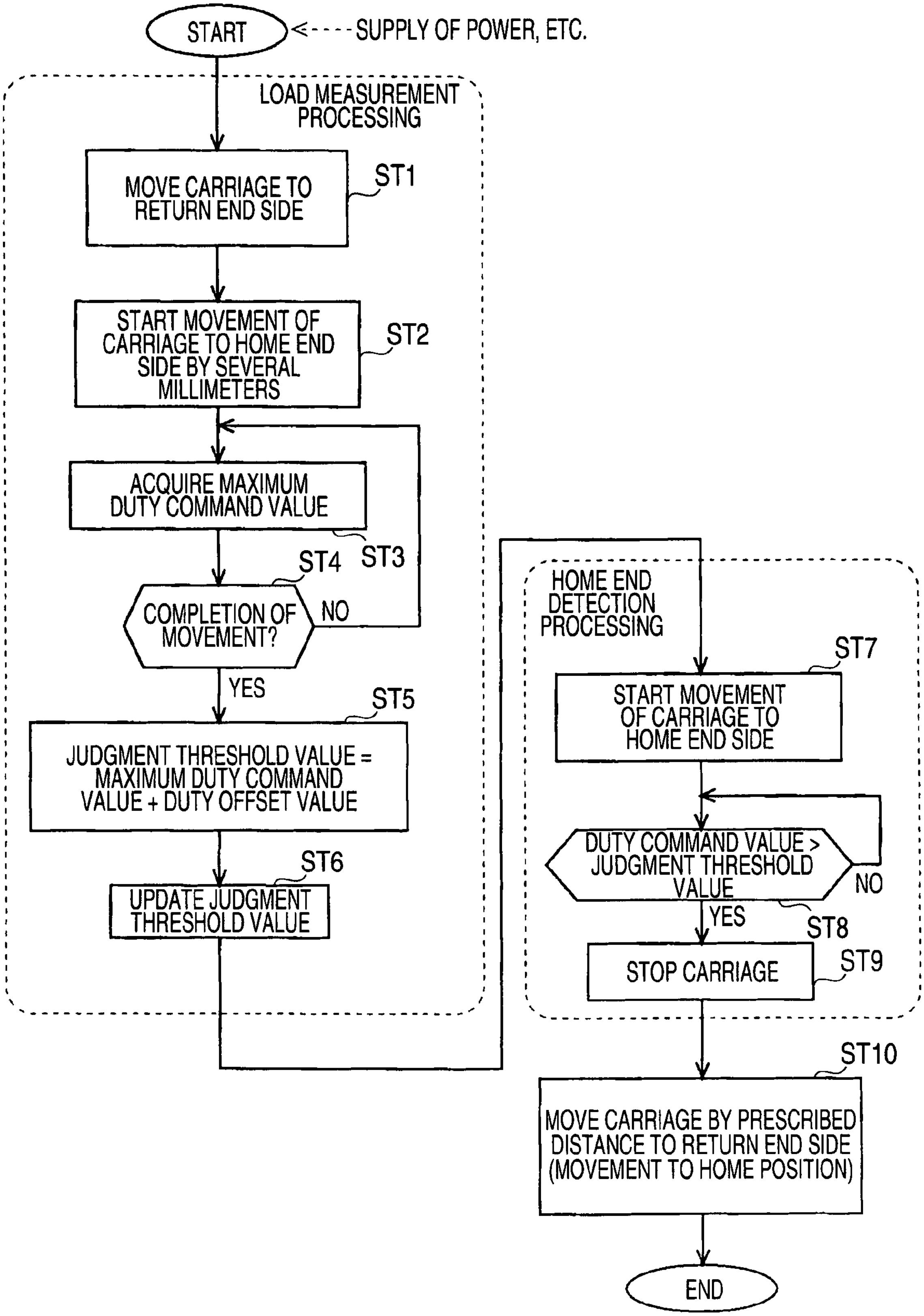
FIG. 3 is a flow chart showing a positioning sequence to a home position.

FIG. 3 is a flow chart showing the flow of a sequence of positioning the carriage 10 in the home position, which is to be executed in the initializing sequence by the sequence control unit 43.

When the sequence of positioning the carriage 10 in the home position is started, the sequence control unit 43 will start load measurement processing. In the load measurement processing, the sequence control unit 43 first causes the carriage 10 to move to the return end side (Step ST1). Specifically, the sequence control unit 43 specifies the target position of the carriage 10 in the vicinity of the return end, the target traveling distance of the carriage 10 to the return end side, etc., for the servo control command value generating unit 42.

When the target position and target traveling distance of the carriage 10 are specified, the servo control command value generating unit 42 will generate an operation command value for driving the CR motor 17, and will update the duty command value in the memory 35 of the ASIC 32. The ASIC 32 supplies the duty command value 36 stored in the memory 35 to the motor driver 33. The motor driver 33 generates pulses of a duty ratio specified by the supplied duty command value, and then outputs them to the CR motor 17. The rotor of the CR motor 17 begins to rotate when the pulses are thereto.

The rotation of the rotor of the CR motor 17 is transmitted to the driving pulley 18 via the gear unit 16. The driving pulley 18 begins to rotate with the rotation of the rotor of the CR motor 17. The driving belt 21 which is stretched between the driving pulley 18 and the driven pulley 20 begins to rotate by the driving pulley 18. The carriage 10 fixed to the driving belt 21 begins to move to the return end side.

When the carriage 10 starts movement to the return end side, the light-receiving element of the optical sensor 15 provided in the carriage 10 intermittently receives light on the basis of the bright and dark pattern of the linear pattern 14, and will then output a detection signal having a pulsed waveform to the ASIC 32. The ASIC 32 counts the number of pulses of the detection signal of the optical sensor 15, and then periodically updates the speed information 38 on the carriage 10 stored in the memory 35, and the positional information 37 on the carriage 10.

Then, the servo control command value generating unit 42 periodically reads the positional information 37 on the carriage 10, the speed information 38 on the carriage 10, etc., from the memory 35 of the ASIC 32. Then, the servo control command value generating unit 42 carries out operation of an operation command value on the basis of the read positional information 37 on the carriage 10, and the read speed information 38 on the carriage 10, and then periodically updates the duty command value 36 stored in the memory 35 of the ASIC 32. Immediately after the target position and target traveling distance of the carriage 10 are specified by the sequence control unit 43, the servo control command value generating unit 42 generates an operation command value so that the duty command value 36 may increase.

When the duty command value 36 stored in the memory 35 of the ASIC 32 is updated in this way, the motor driver 33 generates pulses of a duty ratio specified by the updated duty command value 36, whereby the rotational speed of the rotor of the CR motor 17 changes. The rotational speed of the driving pulley 18 and the driving belt 21 changes following a change in the rotational speed of the rotor of the CR motor 17, and the traveling speed of the carriage 10 also changes following this change.

Further, the servo control command value generating unit 42 will decrease the operation command value (duty command value 36) when the positional information 37 on the carriage 10 periodically read from the memory 35 of the ASIC 32 approaches the target position or target traveling distance of the carriage 10 which is specified by the sequence control unit 43. Finally, the servo control command value generating unit 42 updates the duty command value 36 stored in the memory 35 of the ASIC 32 to "0". The motor driver 33 will complete output of pulses to the CR motor 17 when the duty command value 36 of "0" is written in the memory 35 of the ASIC 32. The rotor of the CR motor 17 stops and the driving pulley 18, the driving belt 21 and the carriage 10 also stop. The carriage 10 moves to a target position the carriage 10 or by a target traveling distance of the carriage which is specified by the sequence control unit 43, and then stops.

Then, the sequence control unit 43 which has specified the target position and target traveling distance of the carriage 10 for the servo control command value generating unit 42 periodically reads the positional information 37 on the carriage 10, the speed information 38 on the carriage 10, etc., from the memory 35 of the ASIC 32. When the sequence control unit 43 confirms that the carriage 10 has stopped at the specified target position or with a target traveling distance on the basis of the read information, then the sequence control unit will issue an instruction of causing the carriage 10 to move to the home end side several millimeters to the servo control command value generating unit 42 (Step ST2).

On the basis of the specification from the sequence control unit 43, the servo control command value generating unit 42 generates an operation command value which causes the carriage 10 to move to the home end side, and then updates the duty command value 36 of the memory 35 of the ASIC 32. Further, the servo control command value generating unit 42 periodically acquires the positional information 37 and speed information 38 on the carriage 10 from the memory 35 of the ASIC 32, then calculates an operation command value, and then updates the duty command value 36 written in the memory 35 of the ASIC 32. When the carriage 10 moves by the specified distance to the home end side, the servo control command value generating unit 42 will update the duty ratio of the duty command value 36 stored in the memory 35 of the ASIC 32 to "0." Accordingly, the carriage 10 moves by the specified distance to the home end side, and then stops.

The sequence control unit 43 which has issued the instruction of causing the carriage 10 to move to the home end side several millimeters to the servo control command value generating unit 42 acquires a maximum value of the duty command value 36 that the servo control command value generating unit 42 periodically updates in the memory 35 of the ASIC 32 (Step ST3). Specifically, the sequence control unit 43 periodically acquires the duty command value 36 from the memory 35 of the ASIC 32 until it confirms that the carriage 10 has moved by the specified distance to the home end side and has then stopped, i.e., until the movement is completed) (Step ST4). Then, the sequence control unit 43 compares the newly acquired duty command value 36 with a maximum value of the duty command value 36 which was acquired in the past, and stores the larger one as the maximum value of the duty command value 36.

If the carriage 10 has moved by the specified distance to the home end side and has then stopped, the sequence control unit 43 will complete the processing of acquiring the duty command value 36, and will then carry out operation of a judgment threshold value (Step ST5). The sequence control unit 43 reads the duty offset value 40 in the memory 39 of the microcomputer 31, inserts the maximum value of the duty command value 36 and the duty offset value 40 in the following Equation 1, for example, and then carries out operation of the judgment threshold value.

Judgment threshold Value=Maximum Value of Duty Command Value 36+Duty Offset Value 40 (Equation 1)

By carrying out operation of the judgment threshold value in the Equation 1, a minimum detection margin required as the duty offset value 40 is ensured between the maximum value of the normal duty command value 36 when the carriage 10 moves to the home end side, and the judgment threshold value. The sequence control unit 43 updates the judgment threshold value 41 stored in the memory 39 of the microcomputer 31 by the calculated judgment threshold value (Step ST6).

By the above load measurement processing, the judgment threshold value 41 having a detection margin equivalent to the duty offset value 40 with respect to the duty command value 36 generated when the carriage 10 actually moves to the home end side is stored in the memory 39 of the microcomputer 31. Next, the sequence control unit 43 starts home end detection processing.

In the home end detection processing, the sequence control unit 43 first specifies the target speed, etc. of the carriage 10 at which the carriage 10 moves to the home end side for the servo control command value generating unit 42 (Step ST7). In addition, the sequence control unit 43 may specify a target traveling distance equivalent to the moving distance of the carriage 10 beyond the distance by which the carriage 10 moves from the return end to the home end, instead of the target speed of the carriage 10.

When the target speed of the carriage 10 at which the carriage 10 moves to the home end side is specified, the servo control command value generating unit 42 will carry out operation of an operation command value which causes the carriage 10 to move to the home end side, and will then update the duty command value 36 of the memory 35 of the ASIC 32. Further, the servo control command value generating unit 42 periodically acquires the positional information 37 and speed information 38 on the carriage 10 from the memory 35 of the ASIC 32, and then updates the duty command value 36 of the memory 35 of the ASIC 32 so that the detection speed of the carriage 10 by the speed information 38 may become the specified target speed.

By driving of the CR motor 17 by this duty command value 36, the carriage 10 moves to the home end side. Then, the carriage 10 is abutted on and stopped by the abutting member 34 disposed at the home side part 7. This results in a so-called abutting state. The optical sensor 15 provided in the carriage 10 stops outputting pulses, and the ASIC 32 updates the speed information 38 on the carriage 10 stored by the memory 35 to "0".

When the speed information on the carriage 10 stored in the memory 35 of the ASIC 32 is updated to "0.", a deviation with a high detection speed with respect to the target speed will be generated. The servo control command value generating unit 42 updates the duty command value 36 of the memory 35 of the ASIC 32 to the duty command value 36 having a larger value.

When the carriage 10 is abutted on and stopped by the abutting member 34, movement of the carriage 10 is prevented by the abutment. Thus, the carriage 10 is kept stopped even if the duty command value 36 is updated to any large value. Therefore, the speed information 38 on the carriage 10 stored in the memory 35 of the ASIC 32 is still "0". The servo control command value generating unit 42 periodically acquires the speed information 38 on the carriage 10 that is still "0", and whenever such acquisition is made, updates the duty command value 36 to a larger value corresponding to a large control deviation. The duty command value 36 stored in the memory 35 of the ASIC 32 is gradually updated to a larger value.

The sequence control unit 43 which has specified the target speed for the servo control command value generating unit 42 acquires the duty command value 36 gradually updated to a larger value by the servo control command value generating unit 42 from the memory 35 of the ASIC 32. The sequence control unit 43 compares the acquired duty command value 36 with the judgment threshold value 41 stored in the memory 39 of the microcomputer 31. The sequence control unit 43 repeats this processing until the acquired duty command value 36 becomes larger than the judgment threshold value 41 (Step ST8).

If the acquired duty command value 36 becomes larger than the judgment threshold value 41, the sequence control unit 43 will output a stop instruction to the servo control command value generating unit 42 (Step ST9).

When the servo control command value generating unit 42 receives the stop instruction, generation of the duty command value 36 will be completed. Thereafter, the servo control command value generating unit 42 updates the duty command value 36 in the memory 35 the ASIC 32 to the duty ratio "0". Accordingly, the motor driver 33 completes output of pulses to the CR motor 17, whereby driving of the carriage 10 by the CR motor 17 is also completed. The carriage 10 stops in a state where it has abutted on the abutting member 34 disposed on the home side. The carriage 10 is positioned in the home end position.

Figure 4A:
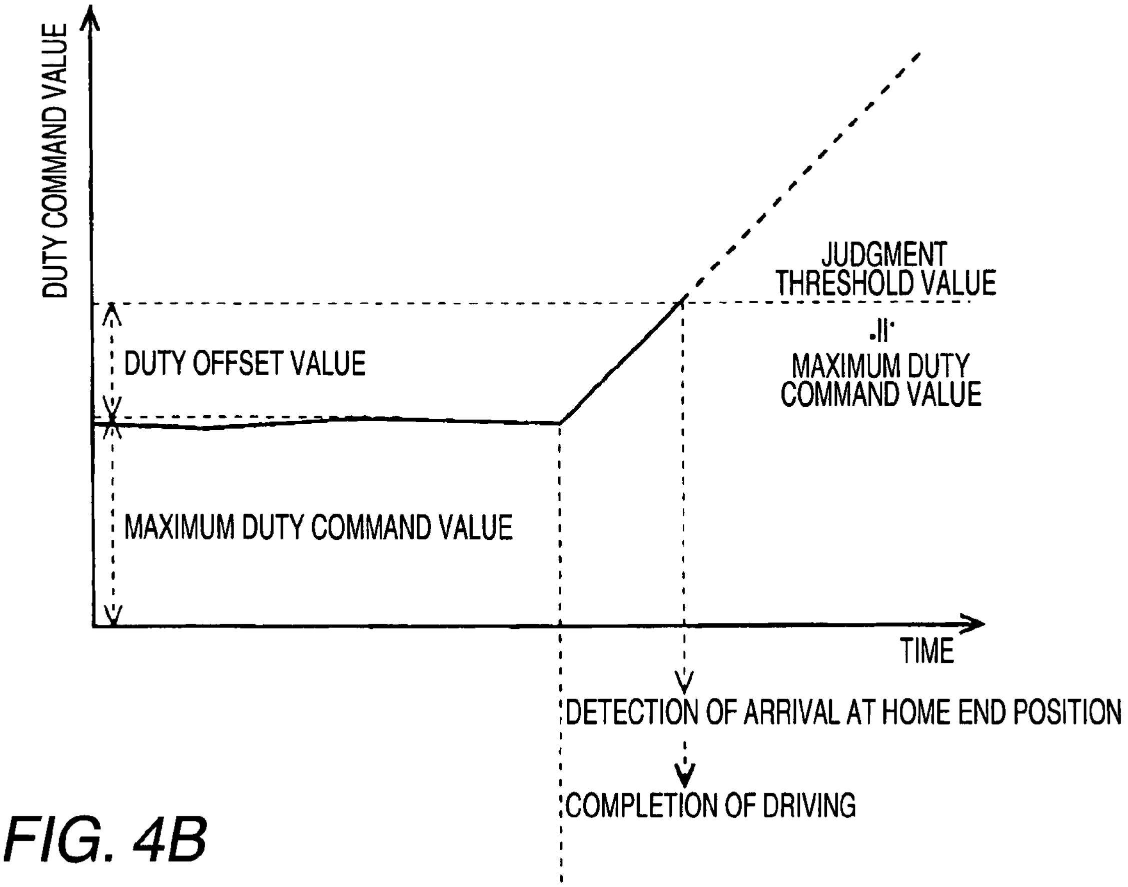
FIG. 4 is a timing chart of a duty command value, etc. in home end detection.
Figure 4B:
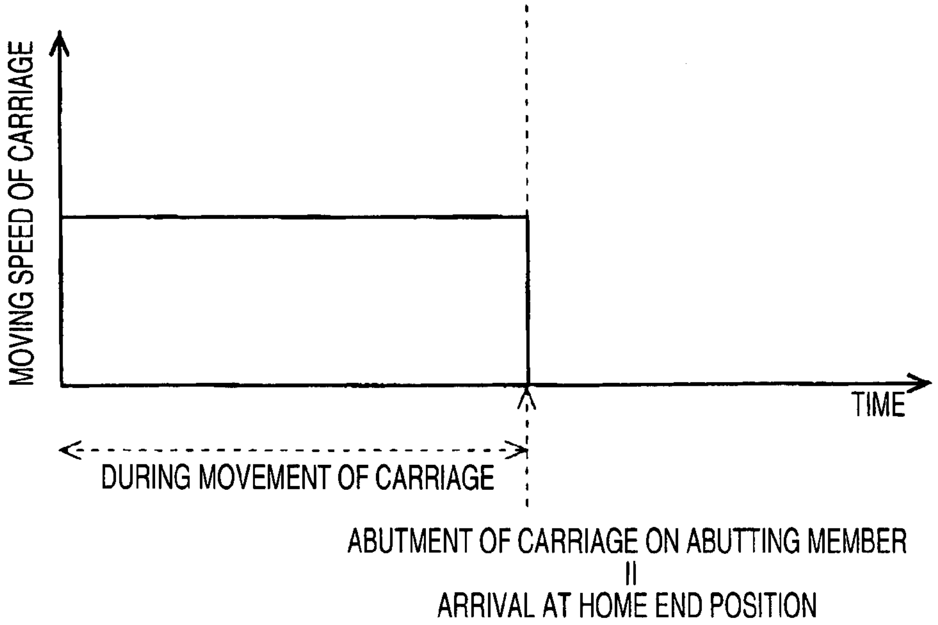

FIG. 4 is a timing chart schematically showing changes with time in the duty command value 36 and the traveling speed of the carriage 10 in the home end detection processing. FIG. 4A is a waveform chart showing a change with time in the duty command value 36 stored in the memory 35 of the ASIC 32. In addition, the duty command value 36 is digital data having a discrete value. Therefore, an actual duty command value 36 changes stepwise. In addition to this, the judgment threshold value 41 stored in the memory 39 of the microcomputer 31 is indicated by dotted lines in the waveform chart of FIG. 4A. FIG. 4B is a waveform chart showing a change with time in the traveling speed of the carriage 10.

In the home end detection processing, the servo control command value generating unit 42 first carries out operation of an operation command value corresponding to a target speed specified by the sequence control unit 43, and then updates the duty command value 36 of the memory 35 of the ASIC 32. The carriage 10 moves to the home end side at almost the same speed as the target speed.

The carriage 10 which moves to the home end side at almost the same speed as the target speed abuts on the abutting member 34 after a while (generation of the abutting state). The carriage 10 is in the home end position. When the carriage abuts on the abutting member 34, as shown in FIG. 4B, the traveling speed of the carriage 10 will become "0". The speed information 38 on the carriage 10 written in the memory 35 of the ASIC 32 will also become "0".

The servo control command value generating unit 42 reads the speed information 38 on the carriage 10, and increases or decreases the duty command value 36 according to a velocity deviation. When the speed information 38 on the carriage 10 is "0", the servo control command value generating unit 42 determines that the speed is too low, and then increases the duty command value 36. The servo control command value generating unit 42 also periodically reads the speed information 38 on the carriage 10 of this speed "0", and increases the duty command value 36 greatly by a number according to a control deviation each time.

As a result, as shown in FIG. 4A, the duty command value 36 begins to increase steeply after the carriage 10 has abutted on the abutting member 34. The duty command value 36 begins to increase steeply to a much larger value than that while the carriage 10 is moving. In addition, if the duty command value 36 becomes large, the driving torque output by the CR motor 17 will increase. The CR motor 17 will push the carriage 10 against the abutting member 34 with a strong force.

While such control of cumulatively increasing duty command value 36 is executed by the servo control command value generating unit 42, the sequence control unit 43 periodically acquires the duty command value 36 stored in the memory 35 of the ASIC 32, and then compares the acquired duty command value with the judgment threshold value 41. The sequence control unit 43 outputs a stop instruction to the servo control command value generating unit 42, if the duty command value 36 becomes larger than the judgment threshold value 41.

Accordingly, in a state where the carriage 10 is positioned in the home end position where it abuts on the abutting member 34, driving of the carriage 10 by the servo control command value generating unit 42 can be completed. The sequence control unit 43 can grasp and position that the carriage 10 is in the home end position, without providing a sensor which directly detects that the carriage 10 is in the home end position.

After the carriage 10 is positioned in the home end position by the above home end detection processing, the sequence control unit 43 starts the processing of causing the carriage 10 to move to the home position on the return end side from the home end position (Step ST10).

Specifically, the sequence control unit 43 specifies the home position, or the traveling distance of the carriage 10 from the home end position to the home position for the servo control command value generating unit 42.

When the home position, or the traveling distance of the carriage 10 from the home end position to the home position is specified, the servo control command value generating unit 42 generates an operation command value which causes the carriage 10 to move to the return end side, and then updates the duty command value 36 of the memory 35 of the ASIC 32. Further, the servo control command value generating unit 42 periodically acquires the positional information and speed information on the carriage 10 from the memory 35 of the ASIC 32, and then updates the duty command value 36 written in the memory 35 of the ASIC 32 on the basis of the information. When the carriage 10 moves to the home position, the servo control command value generating unit 42 will update the duty command value 36 of the ASIC 32 to the duty ratio "0". Accordingly, the carriage 10 moves to the home position and then stops there.

Also, the sequence control unit 43 which has issued the instruction of causing the carriage 10 to move to the home position to the servo control command value generating unit 42 periodically reads the positional information and speed information on the carriage 10 stored in the memory 35 of the ASIC 32. When the carriage 10 moves to the home position and stops there, the positional information on the carriage 10 stored in the memory 35 of the ASIC 32 will be updated to the home position. If the sequence control unit 43 confirms that the carriage 10 is in the home position, the sequence control unit completes the processing sequence of positioning the carriage 10 in the home position as shown in FIG. 3.

In addition, in the above description, the operation of positioning the carriage 10 in the home position when power is supplied to the ink-jet printer 1 has been described. In addition to this, for example, the sequence control unit 43 sometimes makes the operation of positioning the carriage 10 in the home position after a printing sequence based on print data is completed or after a predetermined operation or processing of setting the carriage 10 in positions other than the home position is completed. Even at this time, the sequence control unit 43 executes the positioning sequence shown in FIG. 3.

Also, as the position where the carriage 10 is positioned, there are a cap position, an ink replacement position, etc. besides the home position. Even when the carriage 10 is positioned in the positions, such as the cap position and the ink replacement position, it is desirable that the sequence control unit 43 executes the same positioning sequence as the positioning sequence shown in FIG. 3. However, in this positioning control, the traveling distance of the carriage 10 to the return end side after the carriage is positioned in the home end position becomes the distance from the home end position to the cap position or ink replacement position where the carriage is to be finally positioned.

As described above, the sequence control unit 43 of the present embodiment is able to cause the carriage 10 to stop in the home end position where the carriage abuts on the abutting member 34. The sequence control unit 43 is also able to cause the carriage 10 to move to the home position or the cap position a prescribed distance away from the home end position, and to stop there. Without using a sensor which detects that the carriage 10 is in the home end position, home position, cap position, etc., the sequence control unit 43 is able to grasp that the carriage 10 is in those positions.

Also, in the present embodiment, the sequence control unit 43 carries out operation of the judgment threshold value 41 for determining that the carriage 10 is in the home end position, by the load measurement processing. Also, the judgment threshold value 41 obtained by the operation is a value obtained by adding a determination margin to an actual load of the carriage 10. The judgment threshold value 41 has only a required minimum detection margin to the actual load of the carriage 10. The driving torque to be generated by the CR motor 17 when the duty command value 36 becomes the judgment threshold value 41 does not become so large.

On the other hand, if a fixed value is used as the judgment threshold value, the judgment threshold value needs to be a value for which the following matters are taken into consideration. That is, it is necessary to consider a rise with time in the load that drives the carriage 10, a variation in the torque characteristics of the CR motor 17, a determination margin, etc. for the fixed judgment threshold value.

Figure 5:
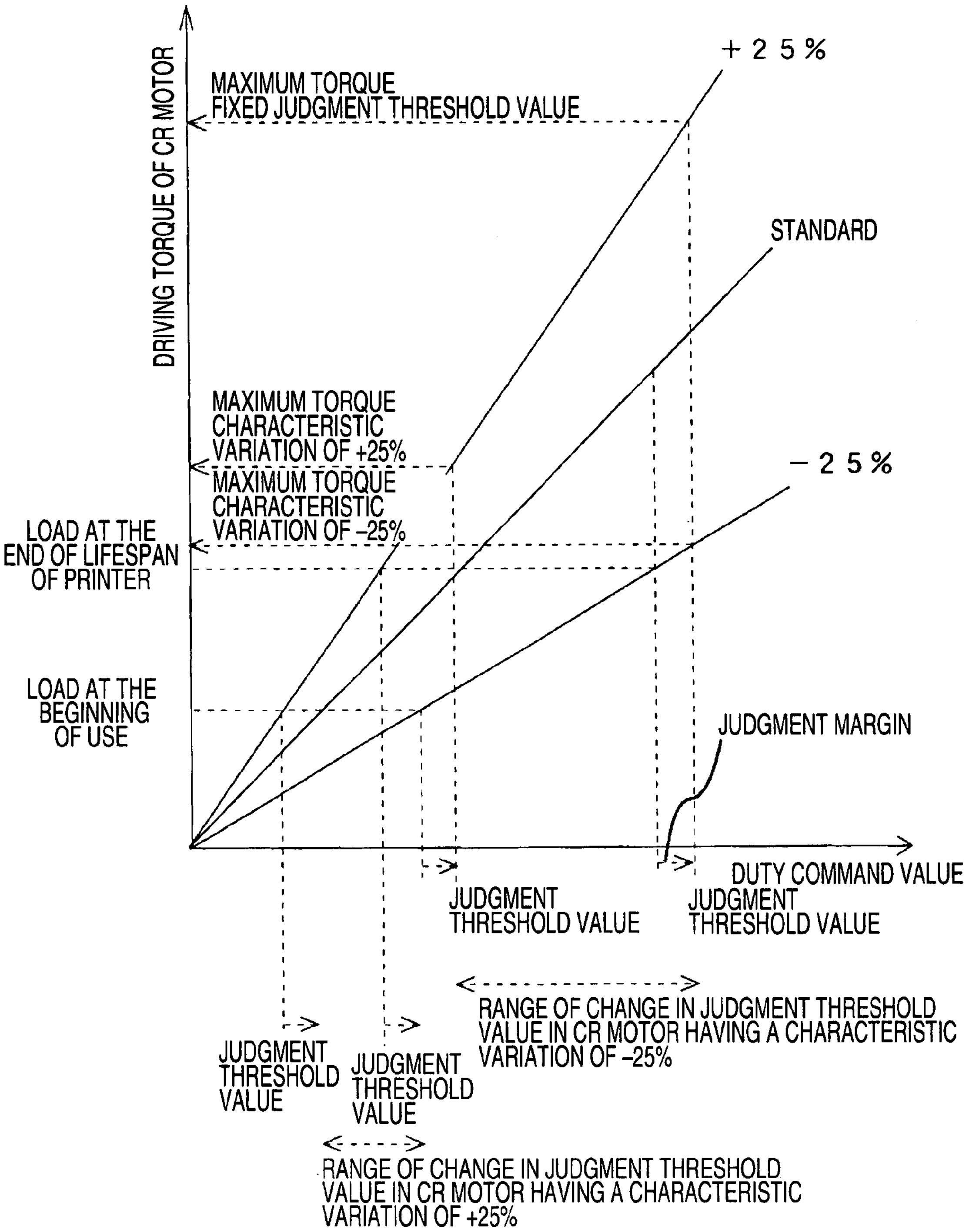
FIG. 5 is an explanatory view showing the relationship between a variation in the driving characteristics of the CR motor, and a judgment threshold value.

FIG. 5 is an explanatory view showing the relationship between a variation in the driving characteristics of the CR motor 17, and a judgment threshold value. In FIG. 5, the axis of abscissa represents the duty command value 36 for driving the CR motor 17, and the axis of ordinate represents the driving torque of the CR motor 17. Also, three characteristic lines including a characteristic line of the CR motor 17 having standard characteristics, a characteristic line of the CR motor 17 which varies in driving torque by −25%, and a characteristic line of the CR motor 17 which varies in driving torque by +25% are plotted in FIG. 5. This CR motor 17 is a motor which varies in driving torque by ±25%.

Hereinafter, the difference between the judgment threshold value 41 periodically updated by the load determination processing and a fixed judgment threshold value will be described referring to FIG. 5.

Although the load which drives the carriage 10 differs according to a concrete configuration or lifespan setting of the ink-jet printer 1, the driving load generally becomes large with use. Here, as an example of this driving load, suppose that the load rises with time from about 200 gf·cm (gram force centimeters) to about 400 gf·cm. Also, the ink-jet printer 1 is designed so that it can endure such load fluctuation of the carriage 10. These driving loads are shown in FIG. 5 as "load at the beginning of use" and "load at the end of the lifespan of a printer."

The torque characteristics of the CR motor 17 vary by ±25% in the example of the CR motor 17 shown in FIG. 5. Even if a motor which varies in torque characteristic by −25% is used as the CR motor 17, it is indispensable that the motor can drive the "load at the end of the lifespan of a printer." In this case, the duty command value 36 to the CR motor 17 becomes a value which allows output of a driving torque more than 534 (≈400/0.75) gf·cm in the case of the CR motor 17 having standard characteristics.

The fixed judgment threshold value needs to be set to a value obtained by adding a determination margin to the duty command value 36 which allows the CR motor 17 to drive the "load at the end of the lifespan of a printer." This is because the sequence control unit 43 determines that the carriage 10 is in the home end position, on the basis of the fact that the duty command value 36 to the CR motor 17 exceeds the fixed judgment threshold value, regardless of a variation in the driving torque of the CR motor 17.

The fixed judgment threshold value determined in this way is also used in common for the CR motor 17 having a torque characteristic variation of +25%. As shown in FIG. 5, when the duty command value 36 exceeding the fixed judgment threshold value is supplied to the CR motor 17 having a torque characteristic variation of 25%, the CR motor 17 outputs at lowest a driving torque obtained by adding a driving torque equivalent to the determination margin to 667 (≈400/0.75×1.25) gf·cm. The CR motor 17 having a torque characteristic variation of +25% outputs this excessive driving torque whenever the sequence of setting the carriage 10 in the home position is executed. The motor 17 will always output this excessive driving torque from the beginning of use of the ink-jet printer 1 to the end of the lifespan of the ink-jet printer 1.

As a result, if the fixed judgment threshold value is used, in order to detect that the carriage 10 is in the home end position, it is necessary to give high rigidity to the carriage supporting section 5 where the CR motor 17 or carriage 10 is disposed so that the supporting section may not be bent by an excessive driving torque generated when the home end detection is carried out. The gear unit 16, driving pulley 18, driving belt 21, etc. which transmit the driving force of the CR motor 17 to the carriage 10 should always endure the excessive driving torque generated whenever the home end detection is carried out, and should have a structure with high rigidity and high reliability which does not cause tooth skipping, etc. Furthermore, the excessive driving torque generated whenever the home end detection is carried out disappears when the duty command value 36 is set to "0" immediately after the detection. The driving torque output by the CR motor 17 will be greatly changed instantaneously from the excessive value to 0. Therefore, it will be necessary to dispose an elongation range regulating member 27 for preventing a spring from elongating and contracting more than a fixed range, a belt guide 28 for preventing a deviation (tooth skipping) from the driving pulley 18 of the belt at the time of torque fluctuations, or the like, as indicated by dotted lines in FIG. 1.

On the other hand, like the present embodiment, if the judgment threshold value is periodically updated by the load determination processing and is set to a value obtained by adding a determination margin to an actually measured load of the carriage 10, the judgment threshold value when the ink-jet printer 1 begins to use becomes a value obtained by adding a determination margin to the duty command value 36 which allows the driving torque of the CR motor 17 to be 200 gf·cm, regardless of a variation in the torque characteristics of the CR motor 17. The greatest driving torque that is generated by the CR motor 17 when the ink-jet printer 1 begins to use becomes much smaller compared with a case where a fixed judgment threshold value is used.

Also, even if the carriage load rises with time to 400 gf·cm, the greatest driving torque generated by the CR motor 17 becomes a value obtained by adding a driving torque equivalent to the determination margin to 500 (=400×1.25) gf·cm, regardless of a variation in the torque characteristics of the CR motor 17. Even if the carriage load rises with time, the greatest driving torque generated by the CR motor 17 also becomes about 167 (=667−500) gf·cm that is lower compared with a case where a fixed judgment threshold value is used.

By actually measuring and calculating the judgment threshold value by the load measurement processing in this way, the greatest driving torque of the CR motor 17 when it is detected that the carriage 10 is in the home end position can be lowered compared with a case where a fixed judgment threshold value is used as the judgment threshold value. That is, the driving load of a driving motor can be prevented from becoming excessive.

As a result, the lifespan of the CR motor 17 can be prolonged, and those having a lower rigidity can be used as the gear unit 16, the driving pulley 18, the driving belt 21, the carriage supporting section 5, etc. Since the maximum value and variation width of the driving torque of the CR motor 17 are small even if the tension of the driving belt 21 is lowered, it is possible to prevent generation of a deviation (tooth skipping) between the driving belt 21 and the driving pulley 18. It also becomes unnecessary to dispose the elongation range regulating member 27, the belt guide 28, etc. in the ink-jet printer 1.

There is also a case where it is possible to use as the CR motor 17 a small-sized motor having a smaller driving torque with respect to the duty command value 36 by actually measuring and calculating the judgment threshold value by the load measurement processing. The CR motor 17 is most miniaturized by using a CR motor 17 having a characteristic variation in which the judgment threshold value in the CR motor 17 having −25% characteristics when the carriage load rises with time becomes almost the greatest duty command value 36 to the CR motor 17. By using the CR motor 17 having such a characteristic variation, the greatest driving torque of the CR motor 17 having +25% characteristics can also be minimized, and the rigidity of the carriage supporting section 5, the gear unit 16, the driving pulley 18, the driving belt 31, etc can be minimized.

As described, in the present embodiment, operation of the threshold value for determining that the carriage 10 is in the home position is carried out by the load measurement processing. Accordingly, those having low rigidity are used as the gear unit 16, the driving pulley 18, the driving belt 21, the carriage supporting section 5 to which these components are attached, etc., a small-sized motor can be used as the CR motor 17, and the cost of a driving device for the carriage 10 can be reduced significantly.

Also, in the present embodiment, the CR motor 17 and the carriage 10 are attached to the carriage supporting section 5, and the abutting member 34 is disposed in the carriage supporting section 5 on the side of the driving pulley 18. Also, the driving force of the CR motor 17 is transmitted to the carriage 10 via the gear unit 16, the driving pulley 18, and the driving belt 21 which are disposed in the carriage supporting section 5. Accordingly, the driving torque when the CR motor 17 pushes the carriage 10 against the a butting member 34 is received by the carriage supporting section 5. By securing the rigidity of the carriage supporting section 5, the carriage 10 can be stably stopped in a position where it abuts on the abutting member 34. Also, a large driving torque when the carriage 10 is pushed against on the abutting member 34 is not directly applied to the driven pulley 20, the spring member 19, etc. It is not necessary to make the driven pulley 20, the spring member 19, etc. into a structure having high strength and reliability.

Although the above embodiment is an example of the preferred embodiment of the present invention, the present invention is not limited thereto, and various modifications and changes can be made without departing from the spirit and scope of the invention.

In the above embodiment, the sequence control unit 43 executes the load measurement processing, for example, in the sequence of positioning the carriage 10 in the home end position. In this case, the sequence control unit 43 will necessarily execute the load measurement processing in advance when the carriage 10 is positioned in the home end position. In addition to this, for example, the sequence control unit 43 may execute the load measurement processing according to sequences other than the sequence of positioning the carriage 10 in the home end position. In this modified example, the sequence control unit 43 may execute the sequence of the load measurement processing, for example, if it has executed the sequence of positioning the carriage 10 in the home end position multiple times.

In the above embodiment, the judgment threshold value 41 calculated by the load measurement processing is utilized to determine that the carriage 10 is in the home end position. In addition to this, as an example of the setting position of the carriage 10, the cap position can be exemplified. In the cap position, a cap member 26 ascends towards the carriage 10, and the recording head 13 is covered with the cap member 26. Also, as the cap member 26 ascends, a lever **26*a* (refer to FIG. 2) of the cap member 26 is inserted into a hole 10*a* of the carriage 10. When the carriage 10 is driven in a state where the cap member 26 is ascending, the carriage 10 will abut on the lever 26*a*. When the carriage 10 is further driven after the carriage 10 abuts on the lever 26*a*, a control deviation in speed increases. Thus, the duty command value 36 to be updated by the servo control command value generating unit 42** will increase.

Therefore, the sequence control unit 43 may activate the carriage 10 after ascent of the cap member 26 is controlled, for example in the capping operation of covering the recording head 13 of the carriage 10 with the cap member 26, and may then confirm that the duty command value 36 during the capping operation becomes more than the judgment threshold value 41 calculated by the load measurement processing. Accordingly, the sequence control unit 43 can confirm that the recording head 13 is correctly covered with the cap member 26. The sequence control unit 43 can grasp that the carriage 10 is in the cap position.

In addition to this, for example, the sequence control unit 43 may activate the carriage 10 for a predetermined time after descent of the cap member 26 is controlled in the uncapping operation of separating the cap member 26 from the recording head 13 of the carriage 10, and may then confirm that the duty command value 36 during the uncapping operation does not become more than the judgment threshold value 41 calculated by the load measurement processing. Accordingly, the sequence control unit 43 can confirm that the cap member 26 descend correctly and is separated from the recording head 13. The sequence control unit 43 can grasp that the carriage 10 is in the cap position or in a position having a traveling distance for a predetermined time from the cap position.

In the above embodiment, the a butting member 34 is provided only on the home end side of the carriage 10. In addition to this, for example, the abutting member 34 may be provided only on the return end side of the carriage 10, or may be provided on both the home end side and the return end side. Also, the sequence control unit 43 may be configured such that the carriage 10 abuts on the abutting member 34 on the return end side, and then the carriage 10 moves to a desired position, in a certain sequence of positioning the carriage 10 in a position, such as the home position or the cap position.

However, the CR motor 17 and the driving pulley 18 are provided on the home end side. The driven pulley 20 on the return end side is attached to the carriage supporting section 5 via the spring member 19. Therefore, there is a possibility that a portion of the force that tends to rotate the driving belt 21 when the carriage 10 is brought into pressure contact into the abutting member 34 on the return end side may be absorbed by the spring member 19, and thereafter the driving belt 21 may be rotated by the force absorbed by the spring member 19 at the time of release thereof when the CR motor 17 has stopped whereby the carriage 10 may move minutely from the return end position.

Therefore, as described in the present embodiment, it is desirable that the sequence control unit 43 is configured such that the carriage 10 abuts on the abutting member 34 on the home end side, and then the carriage 10 moves to a desired position, in all sequences of positioning the carriage 10 in the home position, the cap position, etc.

In the above embodiment, operation of a threshold value for determining that the CR motor 17 abuts on the abutting member 34 and is in a stopped state is carried out by the load measurement processing. In addition to this, for example, the ink-jet printer 1 has a PF motor for transporting a paper P or a CDR tray, an APG (Auto Paper Gap) motor which adjusts the spacing between the platen 4 and the carriage 10, and the like. When a paper jam occurs, the duty command value to the PF motor will increase, and the driving torque of the PF motor will increase. When a CDR tray is pulled into a predetermined pull-in position, the CDR tray will abut on the printer housing 2 or the like, the duty command value to the PF motor will increase, and the driving torque of the PF motor will increase. When the platen 4 moves to a predetermined raised position or a predetermined lowered position, the duty command value to the APG motor will increase, and the driving torque of the APG motor will increase.

The sequence control unit 43 which controls those operating sequences of the ink-jet printer 1 may execute the load measurement processing of the PF motor, the APG motor, etc., and compare a judgment threshold value calculated on the basis of the processing with the duty command value to the PF motor, the APG motor, etc., thereby detecting that an excessive driving load is generated due to a paper jam, that a CDR tray is positioned in a predetermined pull-in position, that the platen 4 is positioned in a raised position, that the platen 4 is positioned in a lowered position, and the like.

In the above embodiment, operation of the judgment threshold value 41 for determining the position of the carriage 10 in the ink-jet printer 1 is carried out from the load measurement processing. In addition to this, for example, the judgment threshold values for detecting positions in a paper transporting motor in a laser printer, a carriage driving motor in a scanner, a paper transporting motor in an automatic paper feeder, etc. may be calculated by the load measurement processing.

The present invention can be suitably utilized in an ink-jet printer, etc. having a driven member, such as a carriage.

What is claimed is:

1. An ink-jet printer comprising:

a recording head for printing;

a movable carriage including the recording head;

a driving motor, driving the movable carriage;

a control command value generating unit, generating a control command value that becomes larger as a control deviation becomes larger, as a control command value to the driving motor;

an abutting member on which the movable carriage abuts;

a stop instructing unit, completing generation of the control command value by the control command value generating unit to stop driving of the driving motor when the control command value generated by the control command value generating unit becomes more than a predetermined judgment threshold value; and a prescribed distance driving instructing unit, causing the control command value generating unit to generate a control command value for allowing the movable carriage to be driven by a first distance in a direction away from the abutting member after the stop instructing unit stops the movable carriage, wherein the predetermined judgment threshold value is based on a signal value provided to the driving motor when the movable carriage is driven by a second distance before the movable carriage is driven in order to print.

2. The ink-jet printer according to claim 1, further comprising a judgment threshold value calculation unit calculating, based on the control command value generated by the control command value generating unit, a judgment threshold value larger than the control command value while the driving motor periodically moves the moveable carriage.

3. The ink-jet printer according to claim 1, wherein the abutting member is disposed at an end of a moving range of the movable carriage.

4. The ink-jet printer according to claim 1, further comprising:

a driving pulley, driven by driving power of the driving motor;

a driven pulley, disposed in a position away from the driving pulley;

a housing, holding the driving pulley and the driven pulley rotatably; and a driving belt which is stretched between the driving pulley and the driven pulley and to which the carriage is attached, wherein the abutting member is disposed at an end of the housing on a side of the driving pulley.

5. A method of driving a movable carriage of a printer comprising:

driving the movable carriage of the printer by generating a control command value for causing the movable carriage to be driven by a driving motor which drives the movable carriage and to move in a direction in which the moveable carriage abuts on an abutting member;

updating the control command value to become a larger value as a control deviation becomes larger;

completing generation of the control command value to stop the moveable carriage when the updated control command value becomes more than a predetermined judgment threshold value; and generating a control command value for allowing the movable carriage to be driven by a first distance in a direction away from the abutting member after the moveable carriage is stopped, wherein the predetermined judgment threshold value is based on a signal value provided to the driving motor when the movable carriage is driven by a second distance before the movable carriage is driven in order to print.

* * * * *